(12) United States Patent
Kreutz et al.

(10) Patent No.: US 10,787,191 B2
(45) Date of Patent: Sep. 29, 2020

(54) ELECTRICALLY LENGTH-ADJUSTABLE STEERING COLUMN FOR A MOTOR VEHICLE

(71) Applicants: THYSSENKRUPP PRESTA AG, Eschen (LI); thyssenkrupp AG, Essen (DE)

(72) Inventors: Daniel Kreutz, Feldkirch (AT); Stefan Sawall, Gams (CH)

(73) Assignees: THYSSENKRUPP PRESTA AG, Eschen (LI); THYSSENKRUPP AG, Essen (DE)

( * ) Notice: Subject to any disclaimer, the term of this patent is extended or adjusted under 35 U.S.C. 154(b) by 274 days.

(21) Appl. No.: 16/067,969

(22) PCT Filed: Jan. 12, 2017

(86) PCT No.: PCT/EP2017/050570
§ 371 (c)(1),
(2) Date: Jul. 3, 2018

(87) PCT Pub. No.: WO2017/125311
PCT Pub. Date: Jul. 27, 2017

(65) Prior Publication Data
US 2020/0269901 A1 Aug. 27, 2020

(30) Foreign Application Priority Data
Jan. 19, 2016 (DE) .................... 10 2016 200 649

(51) Int. Cl.
*B62D 1/19* (2006.01)
*B62D 5/04* (2006.01)
*B62D 1/185* (2006.01)

(52) U.S. Cl.
CPC ............. *B62D 1/195* (2013.01); *B62D 1/185* (2013.01); *B62D 5/0409* (2013.01); *B62D 5/0454* (2013.01)

(58) Field of Classification Search
CPC ...... B62D 1/195; B62D 1/185; B62D 5/0454; B62D 5/0409
See application file for complete search history.

(56) References Cited

U.S. PATENT DOCUMENTS 5,737,971 A 4/1998 Riefe
5,813,289 A * 9/1998 Renick .................. B62D 1/184
280/775

(Continued)

FOREIGN PATENT DOCUMENTS

CN 1118752 A 3/1996
CN 101300163 A 11/2008

(Continued)

OTHER PUBLICATIONS

English Translation of International Search Report issued in PCT/EP2017/050570, dated May 19, 2017 (dated Jun. 1, 2017).

*Primary Examiner* — Drew J Brown
(74) *Attorney, Agent, or Firm* — thyssenkrupp North America, LLC

(57) ABSTRACT

An adjustable steering column for a motor vehicle may comprise a rotatable steering shaft that has a shaft part that can be displaced axially along its axis of rotation. The shaft part may be rotatably mounted in a jacket tube that is mounted in an axially sliding manner in a guide box held on a retaining part fixed to the vehicle body and can be displaced by means of an electric motor. The adjustable steering column is improved with respect to a small installation space of the electrical adjustment in conjunction with high strength of the steering column. A gear rack may be attached to an outer face of the jacket tube. Also, the electric (Continued)

motor may be fastened to the guide box and may drive a worm gear that protrudes through an opening in the guide box towards the jacket tube and meshes with the gear rack.

15 Claims, 5 Drawing Sheets

(56) References Cited

U.S. PATENT DOCUMENTS

| | | | |
|---|---|---|---|
| 9,421,994 B2* | 8/2016 | Agbor | B62D 1/181 |
| 2008/0079253 A1* | 4/2008 | Sekii | B62D 1/181 |
| | | | 280/775 |
| 2008/0229867 A1 | 9/2008 | Waibel | |
| 2009/0013818 A1 | 1/2009 | Arbanas | |
| 2010/0242639 A1 | 9/2010 | Birkwald | |
| 2017/0120944 A1* | 5/2017 | Kato | B62D 1/181 |

FOREIGN PATENT DOCUMENTS

| | | |
|---|---|---|
| CN | 203854710 U | 10/2014 |
| DE | 3318935 C | 12/1984 |
| DE | 3822460 C | 1/1990 |
| DE | 4030405 A | 4/1992 |
| DE | 102013103328 A | 10/2014 |
| EP | 2307259 A | 4/2011 |
| WO | 2014117800 A | 8/2014 |

* cited by examiner

_US 10,787,191 B2_

1

ELECTRICALLY LENGTH-ADJUSTABLE STEERING COLUMN FOR A MOTOR VEHICLE

CROSS REFERENCE TO RELATED APPLICATIONS

This application is a U.S. National Stage Entry of International Patent Application Serial Number PCT/EP2017/050570, filed Jan. 12, 2017, which claims priority to German Patent Application No. DE 10 2016 200 649.5, filed Jan. 19, 2016, the entire contents of both of which are incorporated herein by reference.

FIELD

The present disclosure generally relates to steering columns, including adjustable steering columns for motor vehicles that are displaceable by way of electric motors.

BACKGROUND

An adjustable steering column is known from WO 2014/117800 A1, for example. The steering column known in the art has a plurality of gear racks attached along the circumferential face of a jacket tube which are enclosed by a nut. The nut is connected to an electric motor by means of a toothed belt which can turn the nut and therefore displace the jacket tube. One disadvantage of this design is that a plurality of gear racks is required.

A longitudinally adjustable steering column for a motor vehicle is likewise known from U.S. Pat. No. 5,737,971 A, in which a jacket tube is displaceable longitudinally towards a guide box, wherein the jacket tube is mounted on the guide box by means of rolling elements. The longitudinal adjustment is effected by means of an electric motor which is connected to a pinion via a reduction gear, which pinion meshes with a toothed plate fastened to the jacket tube. The reduction gear is fastened to the guide box. The disadvantage of this design is the complex bearing of the jacket tube and the guide box by means of rolling elements. A further disadvantage is that the reduction gear requires a plurality of components, in order to guarantee the longitudinal adjustment of the jacket tube in respect of the guide box.

An electrically adjustable steering column for a motor vehicle is known from DE 33 18 935 C1, in which an inner jacket tube is arranged telescopically in an outer jacket tube in an axially displaceable manner. The inner jacket tube is provided with toothing on its upper side, with which toothing a worm gear meshes, said worm gear being connected to an electric motor via a reduction gear. The disadvantage of this design is that the outer jacket tube has to be provided with an opening for the passage of the worm gear and is therefore weakened in terms of its stability. Furthermore, the installation space between the outside of the inner jacket tube and the inside of the outer jacket tube is limited, which means that structural limitations for configuration of the toothing of the inner jacket tube result.

Thus a need exists for an improved longitudinal adjustment of an electrically adjustable steering column for a motor vehicle that is configured in a particularly compact manner, having a smaller number of necessary components and its strength and rigidity being independent of the maximum possible length adjustment.

2

Figure 1:
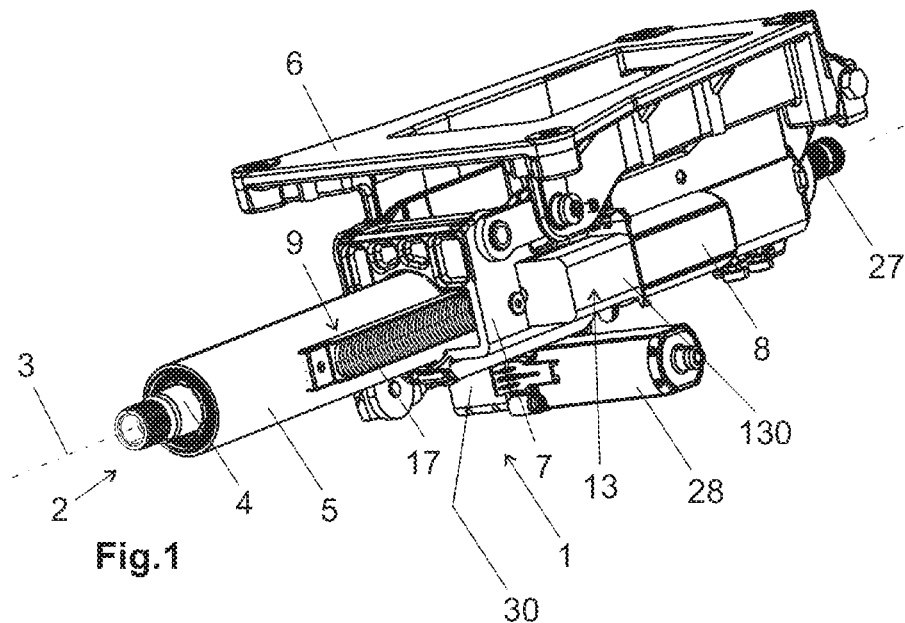
FIG. 1 is a perspective view of an example electrically length-adjustable steering column for a motor vehicle.
Figure 2:
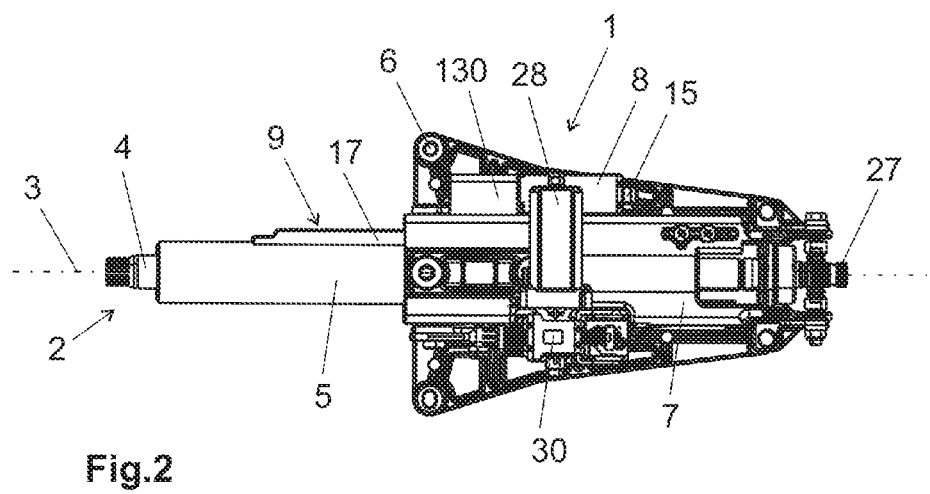

FIG. 2 is a plan view of the underside of the example steering column in FIG. 1.

Figure 3:
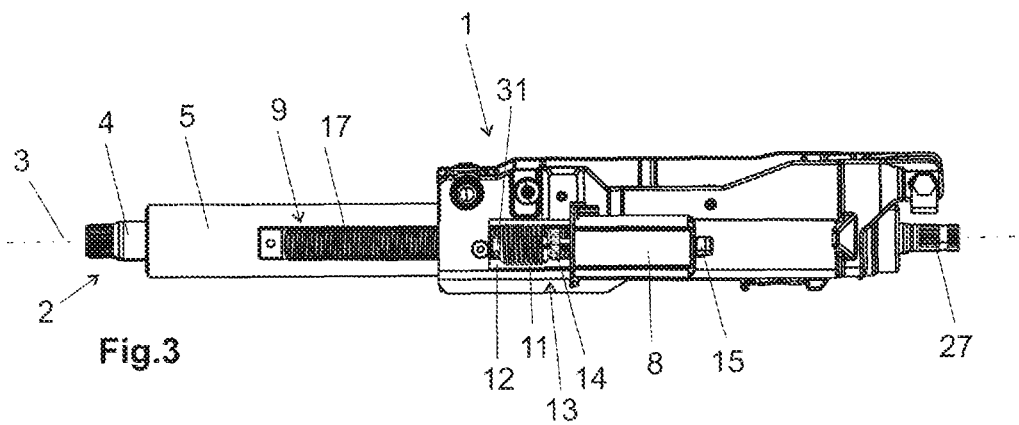

FIG. 3 is a side view of part of the example steering column of FIG. 1.

Figure 4:
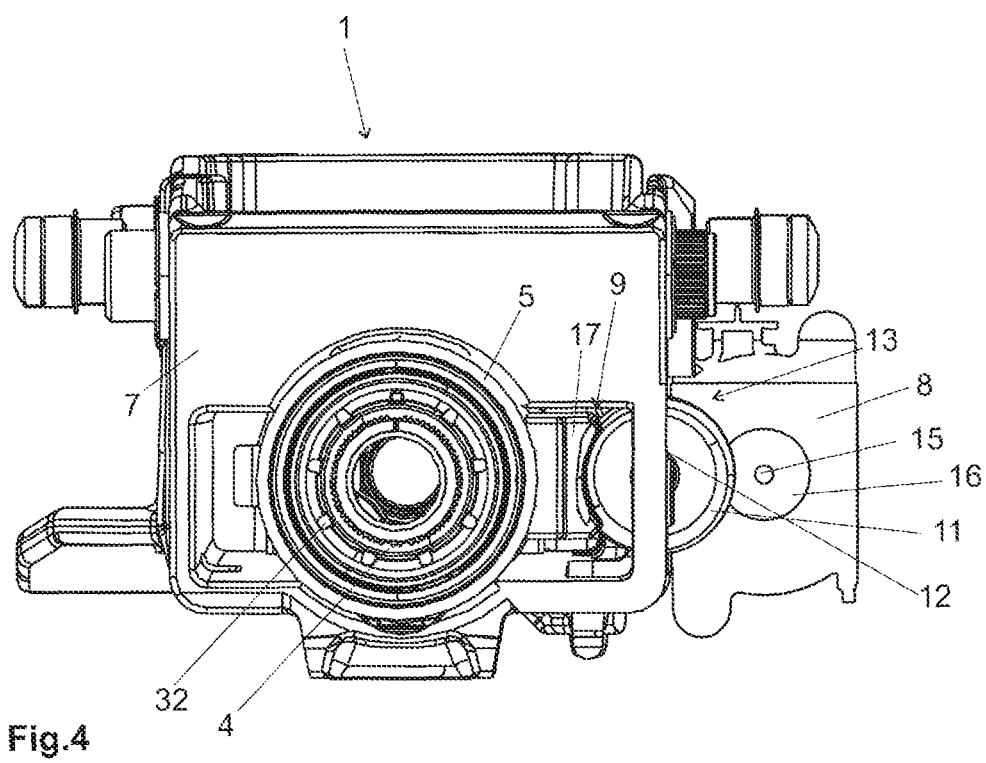

FIG. 4 is a side view of a narrow side of the steering column in FIG. 3 facing a steering wheel.

Figure 5:
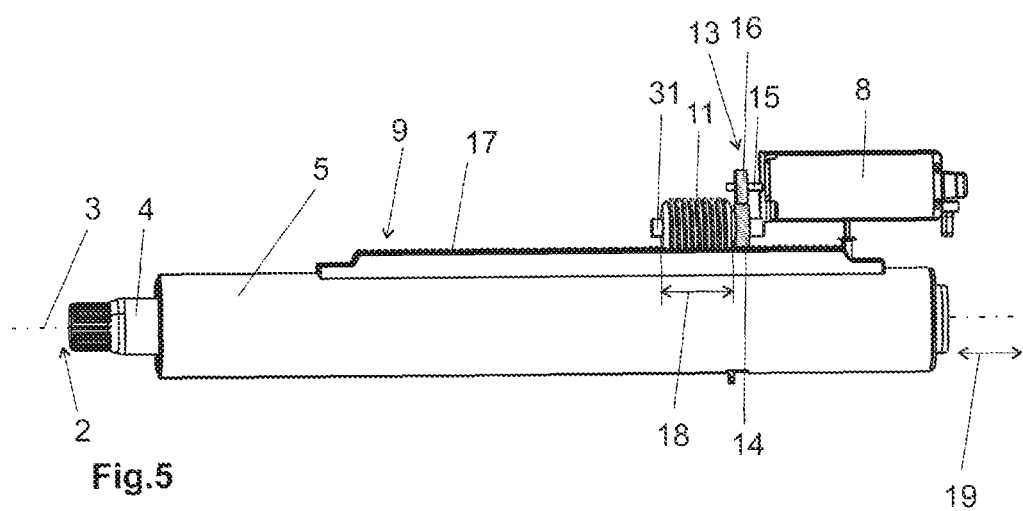

FIG. 5 is a side view of an example jacket tube with a gear rack and electrical adjustment.

Figure 6:
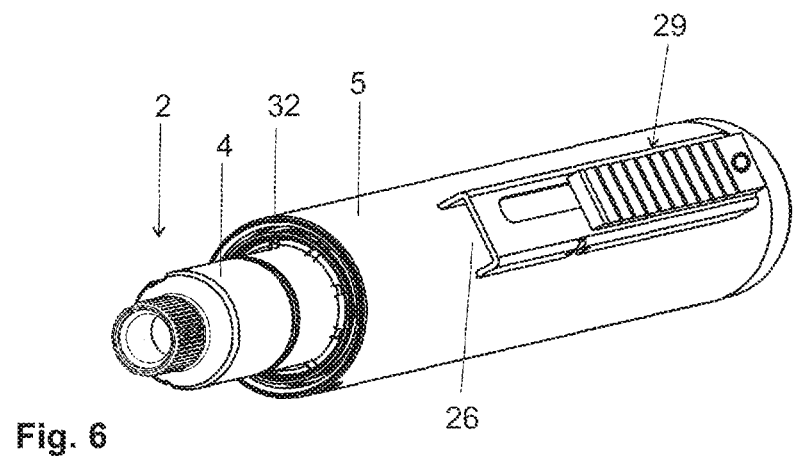

FIG. 6 is a perspective view of an example jacket tube with a steering shaft and a gear rack attached to an outside.

Figure 7:
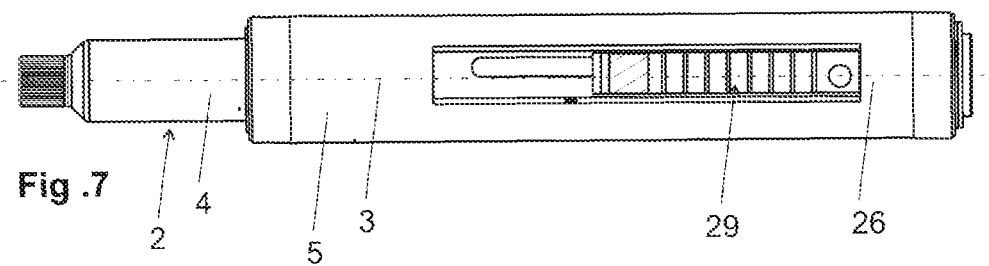

FIG. 7 is a plan view of the example jacket tube of FIG. 6.

Figure 8:
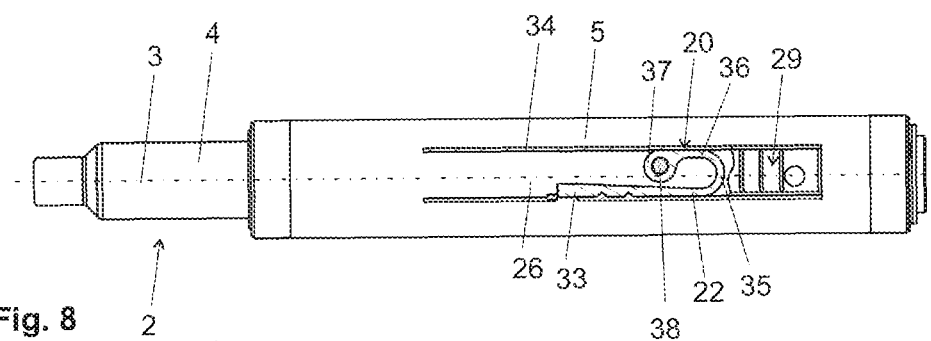

FIG. 8 is a plan view similar to FIG. 7 of an example jacket tube, with the gear rack partially removed, in which a bending wire can be identified before a crash.

Figure 9:
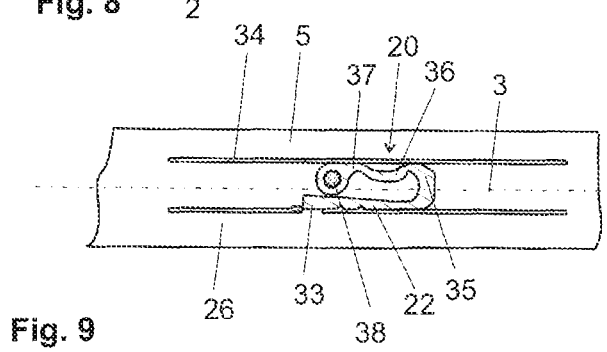

FIG. 9 is a detail view of an example jacket tube in which the bending wire is depicted after a crash.

Figure 10:
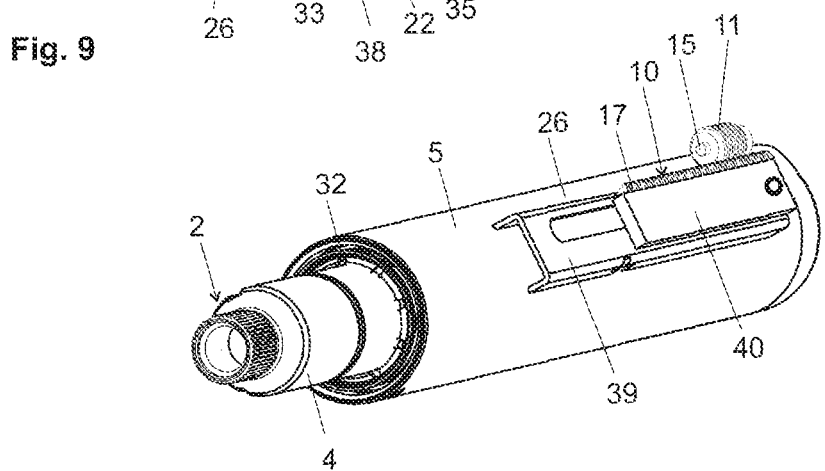

FIG. 10 is a perspective view of an example jacket tube with a steering shaft and a gear rack disposed on another example energy absorption device.

Figure 11:
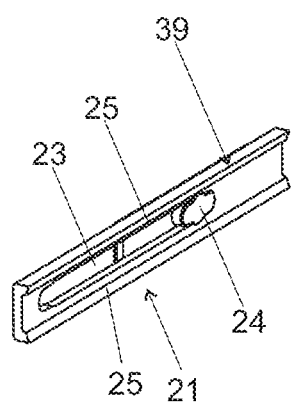

FIG. 11 is a perspective view of an example energy absorption device with an elongate hole and sliding block before a crash.

Figure 12:
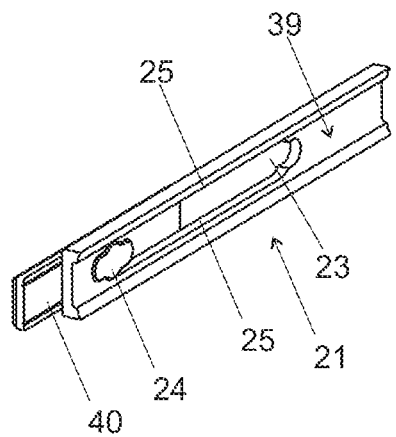

FIG. 12 is a perspective view the example energy absorption device of FIG. 11 following a crash.

DETAILED DESCRIPTION

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting 'a' element or 'an' element in the appended claims does not restrict those claims to articles, apparatuses, systems, methods, or the like having only one of that element, even where other elements in the same claim or different claims are preceded by 'at least one' or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present disclosure generally relates to adjustable steering columns for motor vehicles. In some examples, an adjustable steering column may comprise a rotatable steering shaft that has a shaft part that can be displaced axially along its axis of rotation. The shaft part may be rotatably mounted in a jacket tube that is mounted in an axially sliding manner in a guide box held on a retaining part fixed to the vehicle body and can be displaced by means of an electric motor.

In some examples, a gear rack maybe attached to the outer face of the jacket tube, that the electric motor is fastened to the guide box and drives the worm gear which protrudes through an opening in the guide box towards the jacket tube and meshes with the gear rack. Through the fastening of the electric motor to the guide box, a rigid embodiment of the steering is achieved. Any emergence of unwanted noises caused by the electric motor can be reduced through noise-damping elements such as plastic elements, for example, which are attached to the guide box. The arrangement of the gear rack on the outer face of the jacket tube means that said outer face can be more voluminous and therefore stronger in design than with an attachment to the outer face of the jacket tube. The jacket tube in this case is advantageously unweakened. This means that the entire structure has high strength and rigidity. The length of the worm gear is limited only by the length of the jacket tube. In this way, adjustment paths can be achieved which extend beyond the 80 mm described in the prior art. These may, for example, reach an adjustment path of more than 150 mm. Finally, the opening in the guide box can also be kept relatively small, because this need only allow the relatively small worm gear through. The opening of the guide box may assume a length of less than 70 mm in a preferred embodiment. In other designs an elongate hole is necessary which extends over the entire length of the worm gear. The relatively small dimensions of the opening in the guide box mean that said guide box is practically unaffected in terms of its strength and rigidity.

In a development of the invention, it is provided that a reduction gear is arranged in an operative manner between the electric motor and the worm gear. In this way, the torque is increased so that the force available for the longitudinal adjustment is increased.

In a preferred embodiment of the invention, the reduction gear has a larger gear wheel connected to the worm gear in a non-rotational manner, which larger gear wheel meshes with a small gear wheel fastened on the motor shaft of the electric motor. This structure is quite particularly easy to produce and allows a space-saving arrangement of the electric motor on the outer face of the guide box, wherein the axis of rotation of the electric motor is arranged parallel to the axis of rotation of the steering shaft. In a further embodiment of the invention, it is conceivable and possible for the reduction gear to have a flexible shaft. This design allows the axis of rotation of the electric motor to be arranged offset to the axis of rotation of the steering shaft. A further embodiment of the invention envisages that the gear rack is made of plastic. This measure allows particularly cost-effective production and weight savings.

A further embodiment of the invention envisages that the worm gear is made of plastic, as a result of which the cost and weight can be reduced.

So that the greatest possible axial forces can be transferred between the worm gear and the gear rack, the faces of the teeth which are meshed together and the screw-shaped flanks of the worm gear must be as large as possible. The measure whereby the gear rack has an outer face curved in a channel-shaped manner is used to increase the size of the faces in contact with one another, wherein the bending radius is adapted to the radius of the worm gear. The worm gear can therefore be introduced into the channel in the gear rack and is enclosed by the gear rack over a larger angle range of 30°, for example, than would be the case with a planar gear rack. In this way, larger areas of toothing of the gear rack and the screw windings of the worm gear come into contact with one another in each case, so that greater forces can be transferred without there being a risk of overload. The structure described is also referred to as "helical toothing" or as "semi-globoid" or globoid.

The measure whereby the length of the worm gear in the direction of the axis of rotation is adapted to the forces to be transmitted in the event of a crash means that the axial installation space of the worm gear can be minimized in the event of a crash with given axial forces. In this way, the opening provided for the passage of the worm gear in the guide box can also be configured as small as possible, as a result of which, on the one hand, the guide box is practically unweakened in terms of its stability and, on the other hand, high axial forces occurring in the event of a crash are transmitted via the gear rack/worm gear connection without the aforementioned components becoming unmeshed or shearing off.

The length-adjustable steering column according to the invention is also particularly suitable for the integration of an additional safety-relevant energy absorption device. If an energy absorption device is arranged in an operative manner between the jacket tube and the gear rack, which energy absorption device allows an axial displacement of the gear rack in respect of the jacket tube in the event of a crash while overcoming a design-related deformation force or shearing force, at least some of the crash forces acting in the axial direction on the steering column are dampened and the kinetic energy associated therewith in the energy absorption device is used for the deformation or shearing force of an energy absorber.

In particular, an energy absorption device can easily be provided which has a bending wire that can be deformed under the deformation force. In this case, the energy introduced through deformation of the bending wire is absorbed. A bending wire of this kind can easily be housed between the outside of the jacket tube and the gear rack.

Another embodiment of the energy absorption device envisages that this has a sliding block arranged in an elongate hole which is displaceable under the deformation force through the elongate hole and in this case deforms a material adjacent to the elongate hole. This construction can also easily be housed between the outer face of the jacket tube and the gear rack.

As can be seen in FIGS. 1-5, an electrically adjustable steering column 1 according to the invention for a motor vehicle has a steering shaft 2 that can be rotated about its axis of rotation 3 which has two spindle parts 4, 27 which are connected to one another rotatably, but are telescopically displaceable in respect of one another. The upper shaft part 4 which carries a steering wheel of the motor vehicle which is not shown is axially displaceable in respect of the shaft part 27. The lower shaft part 27 is arranged in an axially fixed manner. The upper shaft part 4 is mounted rotatably in a jacket tube 5. The jacket tube 5 itself is mounted in an axially displaceable manner in a guide box 7, so that it can be adjusted in an axial direction along with the upper shaft part 4 in respect of the guide box 7, wherein the steering wheel which is not shown is axially adjusted.

Axial adjustment takes place by means of an electric motor 8 which is connected via a reduction gear 13 to a worm gear 11 which meshes with a gear rack 9, 10, 29 attached on the outer face 26 of the jacket tube 5.

The guide box 7 is pivotably mounted on a retaining part 6 fixedly connected to the body of the motor vehicle, so that the jacket tube 5 with the upper shaft part 4 of the steering column can be height-adjusted along with the steering wheel which is not shown. For the electric height adjustment, a second electric motor 28 is provided which acts via a second gear 30 on the guide box 7, so that the guide box 7 can be pivoted in respect of the fixed retaining part 6. See FIGS. 1 and 2 in this respect. The electrical height adjustment is not, however, the subject matter of the present invention and is not therefore described in greater detail.

The electric motor 8 responsible for the electrical length adjustment of the steering column 1 is fastened to the outer face of the guide box 7. This also applies to a worm gear 11 driven by the electric motor 8 via the reduction gear 13, the shaft 31 whereof is likewise mounted on the outer face of the guide box 7. It is furthermore conceivable and possible for the reduction gear 13, the worm gear 11 and the electric motor 8 to be mounted in the gear housing 130. The reduction gear 13 comprises a larger gear wheel 14 attached non-rotatably to the shaft 31 of the worm gear 11, which larger gear wheel meshes non-rotatably with smaller gear wheel 16 attached non-rotatably to the motor shaft 15 of the electric motor 8.

As can be seen most clearly in FIGS. 3-5, the worm gear 11 meshes with the toothing of the gear rack 9. In order to allow this, the guide box 7 has an opening 12 through which the worm gear 11 protrudes into the inside of the guide box 7 and meshes with the gear rack 9. This can be best seen in FIGS. 3 and 4.

When the electric motor 8 is switched on, it makes the worm gear 11 rotate via the reduction gear 13, which in turn displaces the gear rack 9 in the axis of rotation direction 19. The displacement direction can be reversed by the electric motor 8 being actuated in such a manner that its direction of rotation is reversed. Since the gear rack 9 is fixedly connected to the jacket tube 5, the gear rack 9 carries along the jacket tube 5 during its axial displacement, which for its part carries along via a roller bearing 32 (see FIGS. 4, 6 and 10) the upper shaft part 4 of the steering shaft 2, and adjusts this along with the steering wheel which is not shown in the axis of rotation direction 19.

The longitudinal adjustment with the modified gear racks 10, 29 shown in FIGS. 6-8 and 10 basically operates in precisely such a manner, when these interact with the worm gear 11 of an adapted electrical adjustment mechanism.

As can be best seen in FIGS. 1, 4 and 10, an outer face 17 of the gear rack 9, 10 meshed with the gear rack 10 in each case is configured in the form of a channel with a partially circular profile, wherein the radius of the partial circle of the profile of the outer face 17 is adapted to the radius of the worm gear 11. It is thereby possible for the largest possible face of the tooth flanks of the gear rack 9, 10 to come into contact with the largest possible face of the worm flanks of the worm gear 11. In this way, the axial forces to be transferred are distributed over a larger face, so that with a given axial force the area loading of the faces meshed with one another is reduced. In this way, when high axial forces are transmitted which can act on the steering column 1 in an axis of rotation direction 19 during a motor vehicle crash, the worm gear 11 is prevented from coming out of engagement with the gear rack 9, 10, for example because the material of the gear rack 9, 10 or of the worm gear 11 gives way.

The described enlargement of the faces meshed with one another even allows production of a gear rack 9, 10 made of plastic which means that production costs can be lowered without the strength of the steering column 1 being inadequate in case of a crash.

The faces of the worm flank of the worm gear 11 meshed with the gear rack 9, 10, 29 become larger when the length of the worm and, ultimately, the length 18 of the worm gear 11 is enlarged, and vice versa. If a maximum axial force occurring in the event of a crash in the axis of rotation direction 19 is assumed, with a given pairing of the gear wheel 11 and the gear rack 9, 10, 29, it is possible to determine what the minimum length 18 of the worm gear 11 must be, in order to supply a sufficient flank face on the worm for transmission of the given axial force to the gear rack 9, 10, 29, without the gear wheel 11 becoming disengaged from the gear rack 9, 10, 29 and slipping. If the length 18 of the worm gear 11 is limited to the value thereby achieved, oversizing and therefore greater production costs for the worm gear 11 can be avoided. Moreover, this measure has the advantage that a short worm gear 11 with a small length 18 also allows a smaller opening 12 in the guide box 7 in the axis of rotation direction 19. A smaller opening 12 in turn weakens the guide box 7 less than a larger opening would do. By limiting the length 18 of the worm gear 11, the rigidity of the guide box 7 can therefore be improved.

The arrangement of an energy absorption device 20, 21 which is arranged in an operative manner between the jacket tube 5 and the respective gear rack 10, 29 is depicted in FIGS. 6-12. The energy absorption device may, as shown in FIGS. 8 and 9, have a bending wire 22 which is supported by its fixed end 33 on a rail 34 which is fastened to the outside 26 of the jacket tube 5. In the region 35 the bending wire 22 is bent by approx. 180°, wherein a shorter region 36 runs in the opposite direction and ends in an eye 37 that is connected to the gear rack 29 by means of a bolt 38.

If strong axial forces occur in the direction of the steering wheel during a vehicle crash, said forces are transmitted via the vehicle body to the retaining part 6, from the retaining part 6 to the guide box 7 and from the guide box 7 via the worm gear 11 to the gear rack 29 which, for its part is connected to the bending wire 22 via the bolt 38 and carries the bending wire 22 along in the axial direction, wherein said bending wire becomes deformed and the region 53 bent through 180° moves closer to the fixed end 33 of the bending wire 22. Said situation is depicted in FIG. 9.

In the case of the bending action, kinetic energy is converted into deformation energy of the bending wire 22 and therefore the force acting in the axial direction on the steering wheel which is not shown is reduced, so that the risk of injury to the driver can thereby be reduced.

Within the scope of the displacement path facilitated by the bending wire 22, the part of the steering column 2 fixedly connected to the motor vehicle can therefore be displaced in the direction of the steering wheel without the jacket tube 5 in this case being displaced with the shaft part 4 and the steering wheel in the direction of the driver.

Conversely, the steering wheel along with the shaft part 4 and the jacket tube could be displaced in respect of the remaining part of the steering column 1 and in respect of the vehicle body in the direction of the front of the vehicle, for example if the driver hits the steering wheel following a vehicle crash. In this way, the path available for interception of the driver's weight is increased and the acceleration forces occurring on the steering wheel during the impact are reduced.

In the case of a second energy absorption device 21 shown in FIGS. 10-12, a modified rail 39 is fixedly attached to the outer face 17 of the jacket tube 5. The rail 39 has an elongate hole 23. A carriage 40 is arranged on the rail 39 which supports the gear rack 10. The carriage is fixedly connected to a sliding block 24 (see FIGS. 11 and 12) which protrudes into the elongate hole 23 in the rail 39. The sliding block 24 is slightly wider than the width of the elongate hole 23, so that it can only be pulled through the elongate hole 23 using a substantial axial force if crash forces act on the gear rack 10 via the worm gear 11 and therefore on the carriage 40. If the sliding block 24 is pulled through the elongate hole 23, the material 25 of the rail 39 becomes deformed at the edges delimiting the elongate hole 23, wherein kinetic energy is absorbed and used to deform the material 25.

The arrangement essential to the invention of the gear rack 9, 10, 29 on the outer face of the jacket tube 5, in conjunction with the arrangement of the electric motor 8 and the gear 13 with the worm gear 11 on the outer face of the guide box 7, allows the described arrangement of the energy absorption devices 20, 21 in an operative manner between the outer face 17 of the jacket tube 5 and the respective gear rack 9, 10, 29 in a particularly simple and cost-effectively producible and also compact design. The concept according to the invention of the electrical length adjustment facilitates high rigidity and displacement paths which may be greater than 180 mm with a small installation space. Moreover, the longitudinal displacement according to the invention may be positioned at each point on the periphery of the jacket tube 5 and the invention is not limited to the position shown in the Figures.

LIST OF REFERENCE NUMBERS

1 Steering column
2 Steering shaft
3 Axis of rotation
4 Shaft part
5 Jacket tube
6 Retaining part
7 Guide box
8 Electric motor
9 Gear rack
10 Gear rack
11 Worm gear
12 Opening
13 Reduction gear
14 Larger gear wheel
15 Motor shaft
16 Smaller gear wheel
17 Channel-shaped outer face
18 Lengths
19 Axis of rotation direction
20 First energy absorption device
21 Second energy absorption device
22 Bending wire
23 Elongate hole
24 Sliding block
25 Material
26 Outer face
27 Shaft part
28 Second electric motor
29 Gear rack
30 Second gear
31 Shaft
32 Roller bearing
33 Fixed end
34 Rail
35 Region
36 Region
37 Hole
38 Bolt
39 Rail
40 Carriage
130 Gear housing

What is claimed is:

1. An adjustable steering column for a motor vehicle, the adjustable steering column comprising:
an electric motor;
a guide box held on a retaining part fixed to a body of the motor vehicle, wherein the electric motor is fastened to the guide box;
a jacket tube that is mounted in an axially sliding manner in the guide box, the jacket tube being displaceable by way of the electric motor;
a gear rack attached to an outer face of the jacket tube, wherein the electric motor drives a worm gear that protrudes through an opening in the guide box towards the jacket tube and meshes with the gear rack, wherein a length of the worm gear is adapted to forces transmitted in a crash event; and
a rotatable steering shaft that has a shaft part that is axially displaceable along its axis of rotation, the shaft part being rotatably mounted in the jacket tube.

2. The adjustable steering column of claim 1 comprising a reduction gear disposed in an operative manner between the electric motor and the worm gear.

3. The adjustable steering column of claim 2 wherein the reduction gear includes a larger gear wheel connected to the worm gear in a non-rotational manner, wherein the larger gear wheel meshes with a smaller gear wheel fastened on a motor shaft of the electric motor.

4. The adjustable steering column of claim 1 wherein the gear rack is comprised of plastic.

5. The adjustable steering column of claim 1 wherein the gear rack includes an outer face curved in a channel-shaped manner, a bending radius of which is adapted to a radius of the worm gear.

6. The adjustable steering column of claim 1 comprising an energy absorption device disposed in an operative manner between the jacket tube and the gear rack, wherein the energy absorption device permits axial displacement of the gear rack with respect to the jacket tube in a crash event while overcoming a deformation force.

7. The adjustable steering column of claim 6 wherein the energy absorption device comprises a bending wire that is deformable under the deformation force.

8. The adjustable steering column of claim 6 wherein the energy absorption device comprises a sliding block disposed in an elongate hole, which sliding block is displaceable under the deformation force through the elongate hole and deforms a material adjacent to the elongate hole.

9. An adjustable steering column for a motor vehicle, the adjustable steering column comprising:
an electric motor;
a guide box held on a retaining part fixed to a body of the motor vehicle, wherein the electric motor is fastened to the guide box;
a jacket tube that is mounted in an axially sliding manner in the guide box, the jacket tube being displaceable by way of the electric motor;
a gear rack attached to an outer face of the jacket tube, wherein the electric motor drives a worm gear that protrudes through an opening in the guide box towards the jacket tube and meshes with the gear rack;
a rotatable steering shaft that has a shaft part that is axially displaceable along its axis of rotation, the shaft part being rotatably mounted in the jacket tube; and
an energy absorption device disposed in an operative manner between the jacket tube and the gear rack, wherein the energy absorption device permits axial displacement of the gear rack with respect to the jacket tube in a crash event while overcoming a deformation force.

10. The adjustable steering column of claim 9 wherein the energy absorption device comprises a bending wire that is deformable under the deformation force.

11. The adjustable steering column of claim 9 wherein the energy absorption device comprises a sliding block disposed in an elongate hole, which sliding block is displaceable under the deformation force through the elongate hole and deforms a material adjacent to the elongate hole.

12. The adjustable steering column of claim 9 comprising a reduction gear disposed in an operative manner between the electric motor and the worm gear.

13. The adjustable steering column of claim 9 wherein the reduction gear includes a larger gear wheel connected to the worm gear in a non-rotational manner, wherein the larger gear wheel meshes with a smaller gear wheel fastened on a motor shaft of the electric motor.

14. The adjustable steering column of claim 9 wherein the gear rack is comprised of plastic.

15. The adjustable steering column of claim 9 wherein the gear rack includes an outer face curved in a channel-shaped manner, a bending radius of which is adapted to a radius of the worm gear.

\* \* \* \* \*